United States Patent

[11] 3,604,338

| [72] | Inventor | Armin Fiedler |
| | | Chicago, Ill. |
| [21] | Appl. No. | 815,337 |
| [22] | Filed | Apr. 11, 1969 |
| [45] | Patented | Sept. 14, 1971 |
| [73] | Assignee | Tastee Freez Industries, Inc. |
| | | Chicago, Ill. |

[54] ELECTRIC BROILER FOR COOKING FOOD
5 Claims, 4 Drawing Figs.

[52] U.S. Cl. ............................................. 99/339,
99/386, 99/391, 99/393, 99/400, 99/443, 99/446
[51] Int. Cl. ............................................. A47j 37/06
[50] Field of Search ............................................. 99/339,
380, 389, 391, 393, 400, 423, 425, 443, 446

[56] References Cited
UNITED STATES PATENTS

| 1,631,655 | 6/1927 | Sunderland et al. | 99/386 UX |
| 2,542,265 | 2/1951 | Staples | 99/386 X |
| 2,556,808 | 6/1951 | Harris | 99/423 |
| 2,646,495 | 7/1953 | Dornbush | 99/393 UX |
| 2,920,177 | 1/1960 | Brane | 99/423 X |
| 3,204,549 | 9/1965 | Palowsky | 99/391 |
| 3,277,813 | 10/1966 | Luscher | 99/391 |
| 3,492,938 | 2/1970 | Oxford et al. | 99/339 |

*Primary Examiner*—Billy J. Wilhite
*Attorney*—Pendleton, Neuman, Williams & Anderson

ABSTRACT: Electric broiler apparatus for cooking food including a housing having an open front portion. A shaft is vertically mounted for rotational movement in the housing, and a cooking rack having an inclined cooking area is secured to said shaft for rotational movement therewith. A toasting rack is also secured to the shaft for rotational movement therewith and is disposed above the cooking rack. A heat shield of conelike configuration is secured to said shaft and is disposed beneath the cooking rack. The cooking and toasting racks and the heat shield project slightly from the front portion of the broiler apparatus for access by the operator. Heat sources are located in the housing above and below the cooking rack and above the toasting rack and an adjustable drive motor is mounted in the housing and is mechanically connected to said shaft for rotating the same.

Inventor
Armin Fiedler
by Pendleton, Neuman,
Seibold & Williams
Atty's

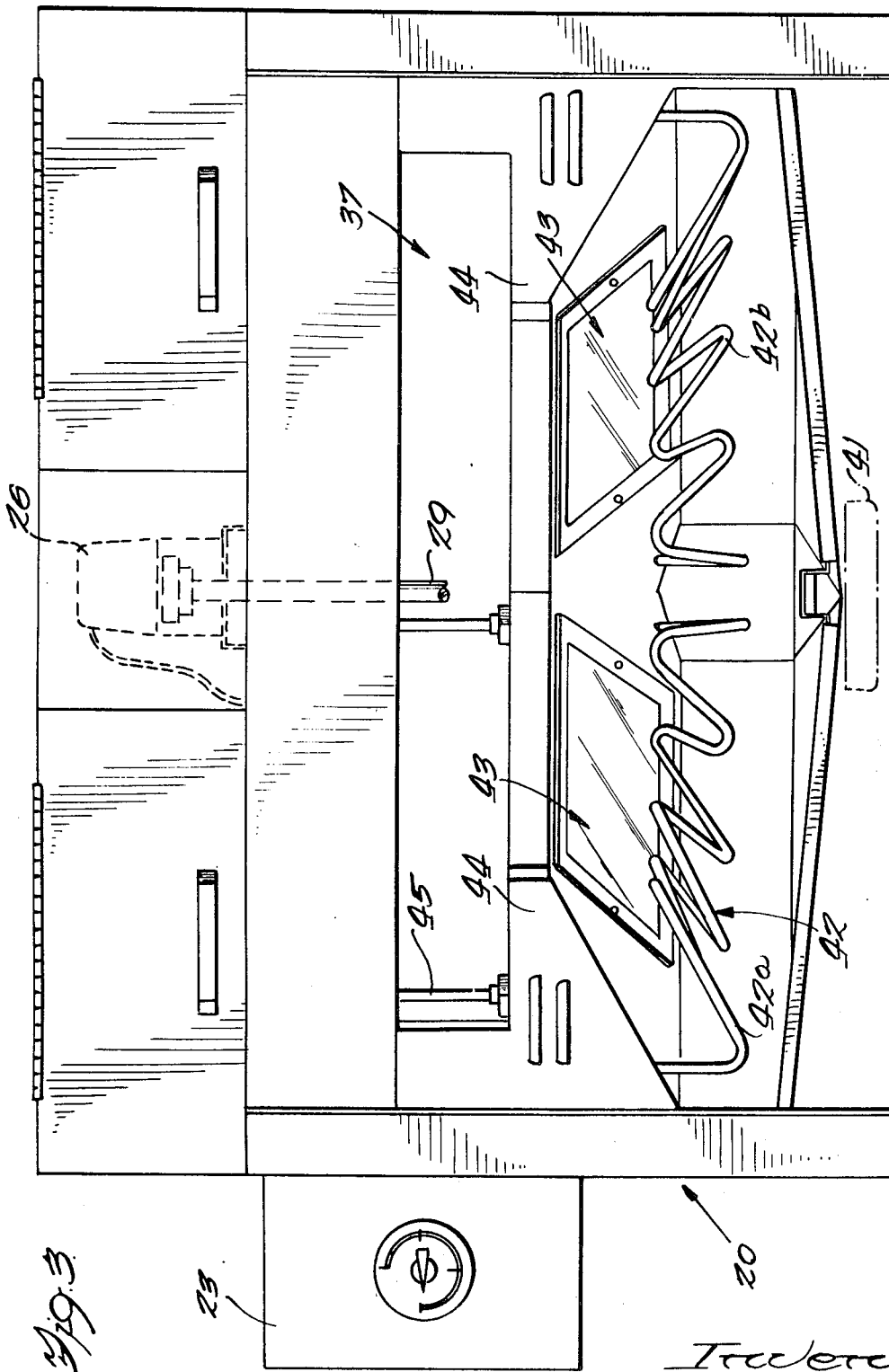

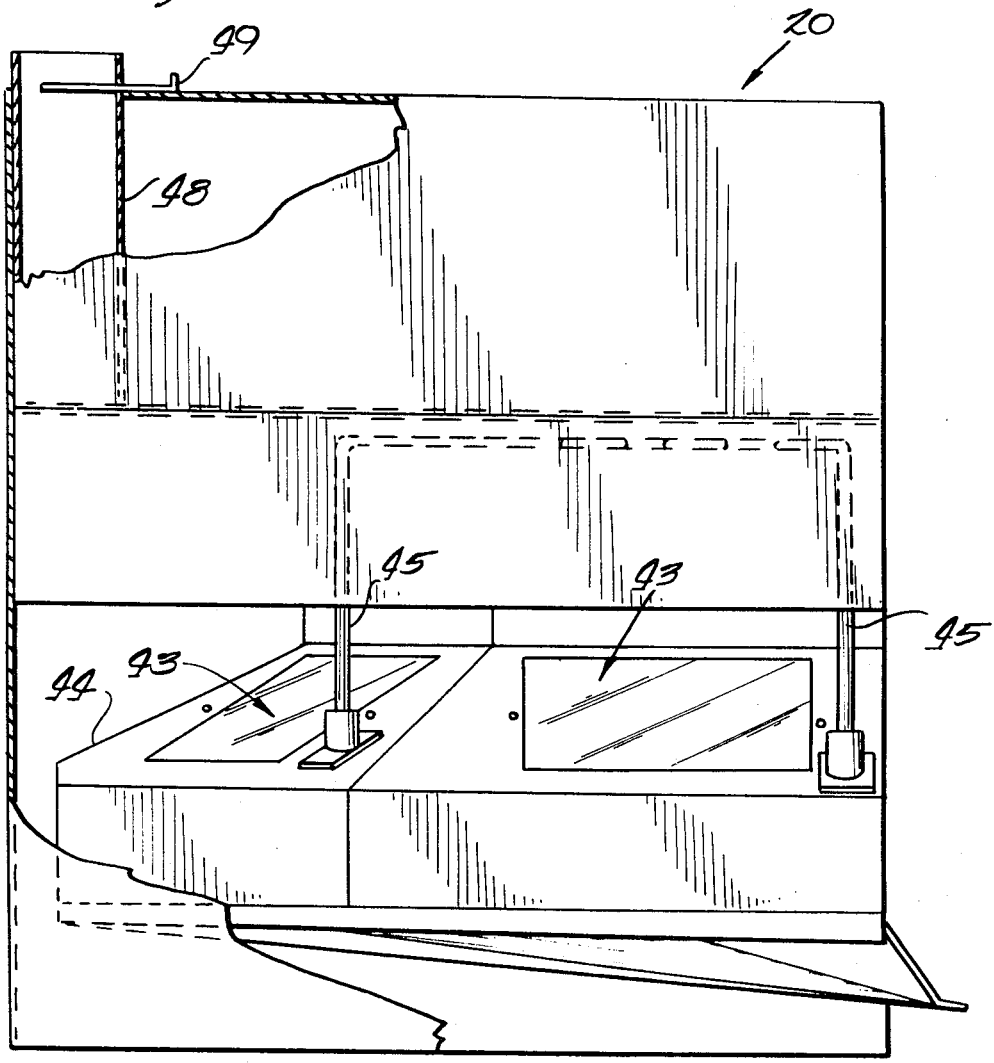

3,604,338

ELECTRIC BROILER FOR COOKING FOOD

BACKGROUND OF THE INVENTION

The field of the invention relates to an apparatus for broiling and toasting foods in a rapid, efficient and safe manner.

A need has arisen for an apparatus that can serve large numbers of people quickly without any sacrifice in the quality of the product sold and without the necessity of employing a large labor force.

The subject invention seeks to provide a simple and relatively inexpensive solution to the indicated problem whereby the food can be cooked and toasted rapidly with a minimum amount of attention by the operator.

SUMMARY OF THE INVENTION

It is an object of the invention to provide an improved broiler apparatus for broiling and toasting foods such as hamburgers.

Another object is to provide an improved broiler apparatus which uniformly heats and cooks foods.

A further object is to provide an improved broiler apparatus which is simple in form, easy to manufacture and efficient and safe in operation.

Other objects and advantages will become apparent from the description, drawings and claims.

The invention in one form comprises a broiler apparatus for cooking food including a housing having an open front portion. A shaft is vertically mounted in said housing and a drive means is carried by the housing and is mechanically connected to the shaft. A cooking rack is carried by the shaft and rotates therewith and is generally flat about its axis and is inclined outwardly and downwardly at its periphery. A heat shield of conelike configuration is carried by the shaft and is disposed beneath the cooking rack. Heat sources are located in the housing both above and below the cooking rack.

BRIEF DESCRIPTION OF THE DRAWING

FIG. 3 is an enlarged front elevational view of the broiler apparatus with certain parts removed; and FIG. 4 is a partial side view, broken away, showing certain parts of the interior of the broiler apparatus.

DESCRIPTION OF THE PREFERRED EMBODIMENT

Figure 1:
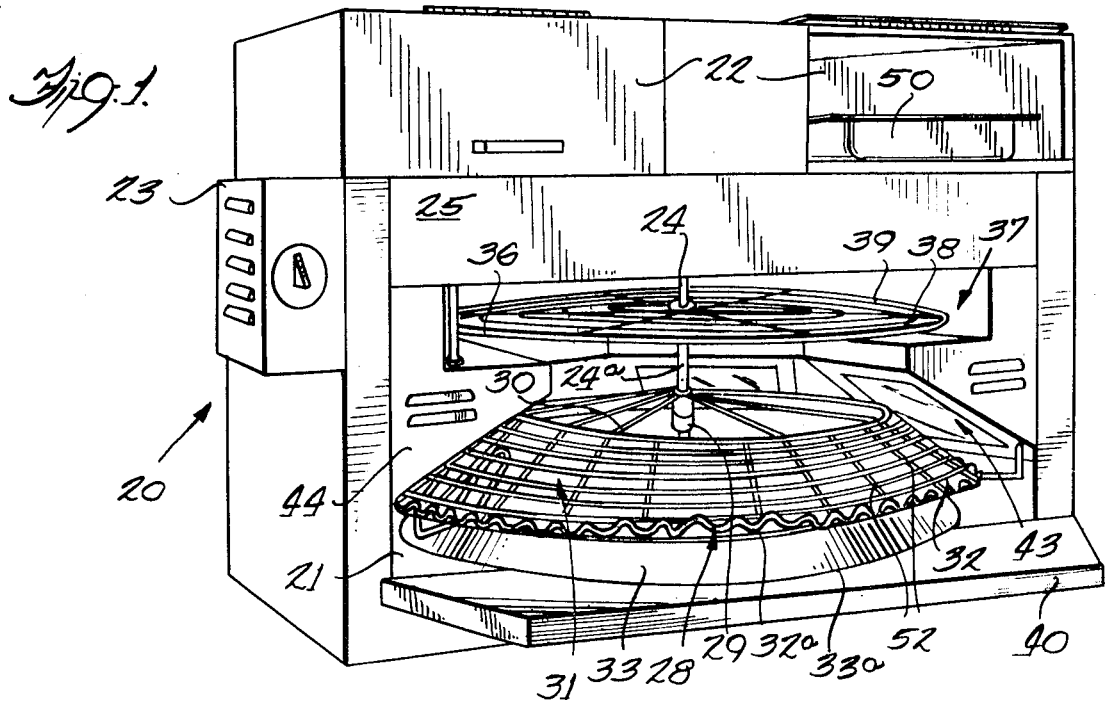
FIG. 1 is a perspective view of the broiler apparatus embodying the invention.

Referring to the drawing, an improved broiler apparatus is shown in FIG. 1 and is generally indicated by the numeral 20. Broiler 20 is generally rectangular in configuration, although the shape is not critical, and includes an open front portion 21, storage chambers 22 and a control box 23 for operating the broiler.

A shaft 24 is mounted vertically within housing 25 of broiler 20 and is suitably mechanically keyed to a motor 26 (FIG. 3). The motor is mounted in the upper portion of broiler 20 and is journaled to a bushing 27 which is secured to the bottom of broiler 20. The motor, which forms no part of the invention, may be a conventional adjustable speed drive mechanism which uses various size pulleys and belts (not shown) to connect with and rotate the shaft.

Figure 2:
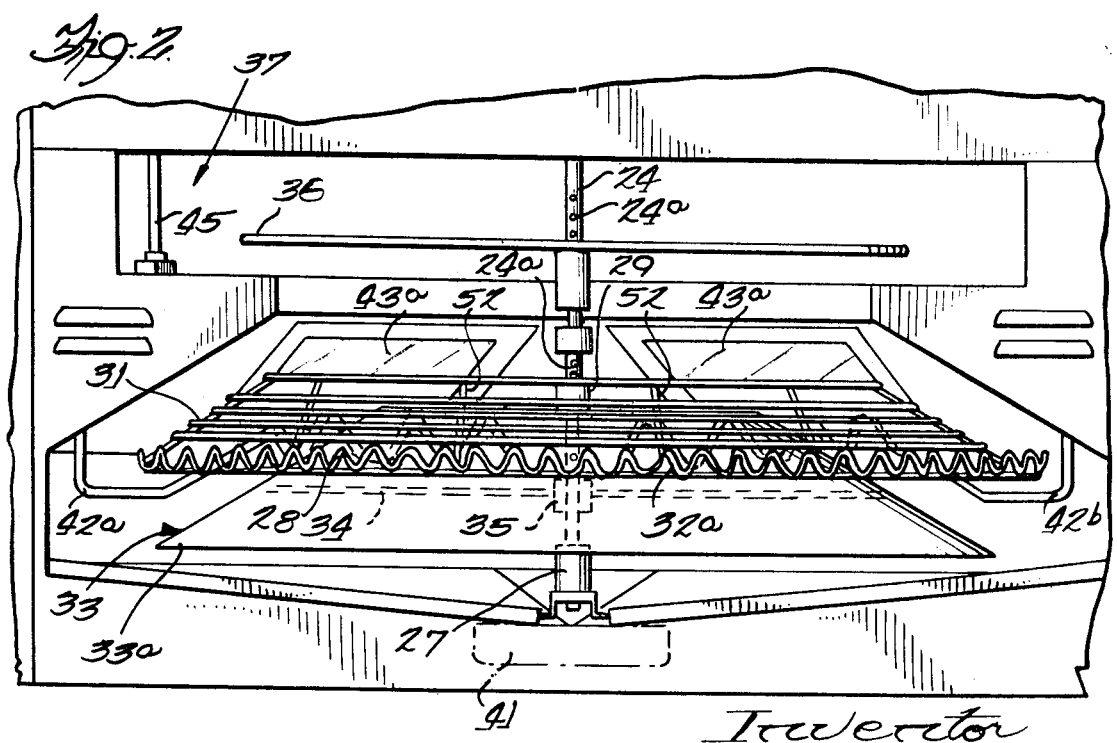
FIG. 2 is a partial front elevational view of the broiler apparatus.

A cooking grill rack 28 is removably secured to shaft 24 by a conventional pin connection (not shown) at its hub 29. Rack 28 rotates with shaft 24 and may be vertically adjusted by using different pin apertures 24a. Rack 28 is generally circular and flat about its axis and is formed from spokes 30 and connecting rings 32. Spokes 30 extend outwardly from hub 29 and are inclined downwardly near the periphery of rack 28 to form a cooking area 31 as shown in FIGS. 1 and 2. Circular rings 32 connect the spokes at the inclined portion to form a cooking area 31. Outermost ring 32a is corrugated and forms a ledge for preventing the food from sliding off the cooking rack when it is placed thereon. Preferably the cooking rack is manufactured from angled wire.

Disposed below the cooking rack and in underlying relation thereto is a heat shield 33 which is generally conelike in configuration at its rim. Spokes 34 connect to hub 35 which is removably pinned to shaft 24 in a conventional manner. Shield 33 also rotates with the shaft and may be vertically adjusted on shaft 24. Preferably the heat shield is mounted on the shaft so that outside edge 33a does not touch the bottom of the broiler (see FIG. 2). The shield is inclined substantially at the same angle as the cooking rack; however, the inclination of the heat shield is not critical. The shield may be manufactured from a stainless steel sheet metal.

A toasting rack 36 is also removably pinned or connected to shaft 24 for rotational movement therewith and is disposed in a recess 37 in broiler 20 above cooking rack 28. Rack 36 may be vertically adjusted by using the different pin apertures 24a (FIG. 2) on shaft 24 for varying the toasting of food placed thereon. Rack 36 is formed from spokes 38 and connecting rings 39 and preferably has a diameter slightly less than the diameter of cooking rack 28. The toasting rack may be manufactured from flat wire.

The cooking and toasting racks and the heat shield project slightly beyond the front portion of broiler 20. This provides an access area for the operator for placing the food on the racks.

A drip pan 40 is mounted on the front portion of broiler 20 and underlies heat shield 33 for catching the grease drippings from the food as it is cooked. Pan 40 extends slightly beyond the periphery of cooking rack 28 and heat shield 33 and is inclined towards the center of broiler 20 to funnel the grease drippings to a collecting pan 41 (FIG. 2).

A heat source 42 (FIGS. 1 and 3) for cooking the food is disposed between heat shield 33 and cooking rack 28. Heat source 42 may consist of two electric calrod heat elements 42a and 42b which extend from one side of broiler 20 to the rear portion thereof. The heat elements are suitably connected to terminal mounting members (not shown) in the interior portion of the broiler. To assure uniform and consistent heating of food when it is placed on the cooking rack, heating elements 42a and 42b are inclined at substantially the same angle as cooking rack 28. As seen by reference to FIG. 3, heating elements 42a and 42b form an abbreviated wire-pulling tension surface. It has been found that by forming the heating elements in this manner, sagging, which normally occurs during heating, is avoided and no support intermediate the ends of the heating elements is necessary.

An additional heating source 43 is disposed in an inwardly projecting enclosure 44 in broiler 20 above the cooking rack and consists of a plurality of infrared heating elements 43a which are preferably conventional quartz heaters. The outer surface of heating elements 43a is also inclined to provide uniform heating of the food.

Another calrod heat element 45 is provided for toasting the buns or other food placed on toasting rack 36. This heat element is suitably mounted on enclosure 44 and extends above the toasting rack (see FIG. 4). Since the primary purpose of heat element 45 is to warm or toast food, it is only necessary to have the heat element extend over approximately one-fourth of rack 36 (FIGS. 1 and 4).

A control box 23 is mounted on the side of broiler 20 and is suitably electrically connected to motor 26 and to the heat sources 42, 43 and 45. A timer is included in the control box 23 which regulates the length of time the broiler is in operation.

A chimney 48 is disposed in the interior corner of the broiler (FIG. 4) for providing the necessary air circulation. A damper 49 which can be manually adjusted by the operator in order to regulate the heat within the broiler is positioned at the top of chimney 48.

The operation of the broiler in the cooking of meat patties or hamburgers will now be described with reference to FIGS.

1 and 2. After the broiler has been allowed to warm up, the broiler may be turned on by activating the switch on the control box which turns on the heating elements and starts the motor driving the shaft. Meat patties (not shown) are placed on the inclined cooking area 31 of rack 28. Outer ring 32a prevents the patties from sliding off the cooking rack. The buns (now shown) may be placed on toasting rack 36 while the patties are being cooked. The cooked patties and buns may be stored in bins 50 located in chambers 22 in the broiler. (See FIG. 1). In a normal operation, the patties are rotated on the cooking rack slowly enough so that the operator can place the cooked patty and its bun in a bin and store it without having to stop the broiler.

The inclined portion of cooking rack 28 facilitates drainage of moisture and grease from the cooked patty. Also, the cooking rack is provided with additional spokes 52 which serve to convey the moisture and grease down to the drip pan.

As indicated above, heat shield 33 is also inclined. The purpose of providing the heat shield is to produce a heat differential between the grease accumulation in the drip pan and the hot end of calrod heat elements 42a and 42b. This heat differential reduces the possibility of grease accidentally catching fire during the operation of the broiler. Since the heat shield rotates with the racks, it is cooled as it passes out into the open front portion of the broiler which further increases the heat differential.

The broiler is not limited to cooking meat patties, but may be used to cook or warm many different types of foods. To adapt the broiler for cooking different foods the speed of rotation of the racks may be simply varied by changing the size of the pulleys in the motor to increase or decrease the time that the food is exposed to the heat elements.

Thus, an improved broiler has been provided which uniformly heats and cooks foods and is simple in form, easy to manufacture and efficient and safe in operation.

While a particular embodiment of the invention has been shown, it is to be understood that the invention is not limited thereto since many minor modifications may be made which are within the true spirit and scope of the invention.

The invention having thus been described, what is claimed and desired to be secured by Letters Patent is:

1. An apparatus for cooking food comprising a housing having an open front portion for feeding and discharging food; a rotatable shaft vertically mounted within said housing; a cooking rack carried by said shaft and rotatable therewith, said cooking rack having an outwardly inclined periphery for receiving food, a segment of which projects outwardly through said housing open front portion, a toasting rack for receiving food carried by said shaft and rotatable therewith, said toasting rack being disposed above said cooking rack; a heat shield subtending the outwardly inclined periphery of said cooking rack and carried by said shaft and rotatable therewith, said heat shield being of conelike configuration and having a peripheral segment projecting through said housing; heat sources located in said housing above and below said cooking rack; and a means carried by said housing in driving relation with said shaft.

2. The invention according to claim 1 wherein an additional heat source is disposed within said housing above said toasting rack for heating foods placed thereon.

3. The invention according to claim 1 wherein chambers are provided in said housing for the storage of cooked food. 10."

4. The invention according to claim 1 wherein a drip pan is attached to the front portion of said housing and underlies the portions of said cooking rack and said heat shield which project beyond the front portion of the housing.

5. The invention according to claim 1 wherein the cooking rack includes a means for draining the grease and moisture from the cooked food to the drip pan.

UNITED STATES PATENT OFFICE
CERTIFICATE OF CORRECTION

Patent No. 3,604,338             Dated   September 14, 1971

Inventor(s)   Armin Fiedler

It is certified that error appears in the above-identified patent and that said Letters Patent are hereby corrected as shown below:

Col. 2, line 45 - Delete "wire-pulling tension" and insert therefor -- conical --

Col. 3, line 7 - "(now shown)" should be -- (not shown) --

Col. 4, line 27 (last line of Claim 3) - Delete 10."

Signed and sealed this 21st day of March 1972.

(SEAL)
Attest:

EDWARD M. FLETCHER, JR.         ROBERT GOTTSCHALK
Attesting Officer               Commissioner of Patents